United States Patent
Hosey et al.

(10) Patent No.: US 11,627,454 B2
(45) Date of Patent: Apr. 11, 2023

(54) METHOD AND SYSTEM TO DETECT PREVIOUS DRIVER OF VEHICLE IN EMERGENCY SITUATION

(71) Applicant: GM Global Technology Operations LLC, Detroit, MI (US)

(72) Inventors: Eric T. Hosey, Royal Oak, MI (US); Matthew Edward Gilbert-Eyres, Rochester, MI (US); Russell A. Patenaude, Macomb Township, MI (US); David Nicky Yang, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/409,032

(22) Filed: Aug. 23, 2021

(65) Prior Publication Data

US 2023/0054000 A1 Feb. 23, 2023

(51) Int. Cl.
*H04W 4/90* (2018.01)
*G07C 5/00* (2006.01)
*B60R 25/102* (2013.01)
*H04W 48/04* (2009.01)
*H04W 76/50* (2018.01)

(52) U.S. Cl.
CPC ............. *H04W 4/90* (2018.02); *B60R 25/102* (2013.01); *G07C 5/008* (2013.01); *H04W 48/04* (2013.01); *H04W 76/50* (2018.02)

(58) Field of Classification Search
CPC .............................. G07C 5/0816; H04W 4/90
See application file for complete search history.

(56) References Cited

U.S. PATENT DOCUMENTS

| | | | | |
|---|---|---|---|---|
| 4,067,411 A | * | 1/1978 | Conley | B60R 25/102 180/169 |
| 7,289,786 B2 | * | 10/2007 | Krasner | G08B 25/08 340/436 |
| 9,576,480 B1 | * | 2/2017 | Shoshan | G08G 1/096716 |
| 2005/0275543 A1 | * | 12/2005 | Hisano | G08B 25/001 340/539.13 |
| 2020/0118418 A1 | * | 4/2020 | Benjamin | G08B 25/016 |
| 2021/0212158 A1 | * | 7/2021 | Robertson, II | H04W 4/023 |
| 2021/0274130 A1 | * | 9/2021 | Nodder | G08B 25/008 |
| 2021/0377706 A1 | * | 12/2021 | Lekutai | H04W 4/06 |

* cited by examiner

Primary Examiner — Qutbuddin Ghulamali
(74) Attorney, Agent, or Firm — Vivacqua Crane PLLC

(57) ABSTRACT

A method to detect an operator of an automobile vehicle includes: identifying if an emergency situation is occurring in an automobile vehicle; determining if a communication device is currently connected or was previously connected in the automobile vehicle; identifying a most recently connected operator of the communication device; and sending a signal identifying the emergency situation is occurring to the most recently connected operator of the communication device.

17 Claims, 3 Drawing Sheets

METHOD AND SYSTEM TO DETECT PREVIOUS DRIVER OF VEHICLE IN EMERGENCY SITUATION

The present disclosure relates to automobile vehicle emergency detection and communication systems and methods.

Present automobile vehicles which include cars, trucks, light duty trucks, vans, sport-utility-vehicles, electrically powered vehicles and the like commonly include a control system which monitors for emergency conditions occurring in the automobile vehicle and communicates automatically and electronically with an emergency service such as a police department and a fire department if an emergency condition is detected. Emergency conditions may include but are not limited to a vehicle accident, a vehicle fire, a vehicle battery thermal runaway event, and the like. Because the emergency service was contacted by the control system and not directly by a person or vehicle operator, the emergency service may then attempt to contact the automobile vehicle owner or operator to alert them of the emergency condition.

With the current information available to emergency services, the emergency service may only be able to call phone numbers that are on file. This contact information may not be most recent person or operator in possession of the vehicle, or the contact information may not be the correct contact information. This situation is detrimental in an emergency scenario such as a battery thermal runaway event where the main goal in triaging the situation is to get people out of a house, a parking garage or operating area and as far away from the automobile vehicle as possible and to notify the appropriate people of the emergency.

Thus, while current automobile vehicle emergency detection and communication systems achieve their intended purpose, there is a need for a new and improved system and method providing automobile vehicle emergency detection and communication.

SUMMARY

According to several aspects, a method to detect a vehicle operator includes: identifying if an emergency situation is occurring in an automobile vehicle; determining a status of a communication device presently or previously connected in the automobile vehicle; retrieving a current dialable number of the communication device; and uploading and storing the current dialable number in a system remote from the automobile vehicle.

In another aspect of the present disclosure, the method further includes retrieving emergency contact data and a device number saved in the communication device.

In another aspect of the present disclosure, the method further includes storing the emergency contact data in the system remote from the automobile vehicle.

In another aspect of the present disclosure, the method further includes loading a device identification number of the communication device retrieved from the presently or previously connected communication device into the system remote from the automobile vehicle.

In another aspect of the present disclosure, the method further includes when the communication device is presently connected in the automobile vehicle sending a signal to the communication device identifying presence of the emergency situation.

In another aspect of the present disclosure, the method further includes when the communication device is not presently connected in the automobile vehicle identifying a most recently connected operator of the communication device.

In another aspect of the present disclosure, the method further includes sending a signal to the communication device identifying presence of the emergency situation to the most recently connected operator of the communication device.

In another aspect of the present disclosure, the method further includes notifying an emergency service if the most recently connected operator of the communication device is not available.

In another aspect of the present disclosure, the method further includes confirming if the emergency situation is a thermal runaway event occurring in a battery pack of the automobile vehicle.

In another aspect of the present disclosure, the method further includes sending a connection status of the communication device to the system remote from the automobile vehicle.

According to several aspects, method to detect a vehicle operator includes: identifying if an emergency situation is occurring in an automobile vehicle; determining if a communication device is currently connected or was previously connected in the automobile vehicle; identifying a most recently connected operator of the communication device; and sending a signal identifying the emergency situation is occurring to the most recently connected operator of the communication device.

In another aspect of the present disclosure, the method further includes retrieving a current dialable number of the communication device.

In another aspect of the present disclosure, the method further includes uploading and storing the current dialable number in a system remote from the automobile vehicle.

In another aspect of the present disclosure, the method further includes identifying a name of the communication device and saving the name in the system remote from the automobile vehicle.

In another aspect of the present disclosure, the method further includes identifying emergency contact data saved in the communication device and saving the emergency contact data to the system remote from the automobile vehicle.

In another aspect of the present disclosure, the method further includes identifying if one or more occupants are currently present in the automobile vehicle.

In another aspect of the present disclosure, the method further includes: determining a last known occupant if no occupants are currently present in the automobile vehicle and no communication device is currently connected by identifying a most recently connected communication device; and contacting the last known occupant.

According to several aspects, a system to detect an operator of an automobile vehicle includes a detection device identifying an emergency situation is occurring in an automobile vehicle. A communication device currently connected to the automobile vehicle or previously connected to the automobile vehicle. A most recently connected operator of the communication device identified by accessing the communication device. A signal identifying the emergency situation is occurring forwarded to the most recently connected operator of the communication device.

In another aspect of the present disclosure, a system remote from the automobile vehicle has a current dialable number of the communication device uploaded to and stored within. A name of the communication device is saved in the system remote from the automobile vehicle. Emergency contact data is saved in the communication device retrieved from the communication device and uploaded to the system remote from the automobile vehicle.

In another aspect of the present disclosure, a battery pack is provided with the automobile vehicle, wherein the emergency situation defines a thermal runaway event occurring in the battery pack.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
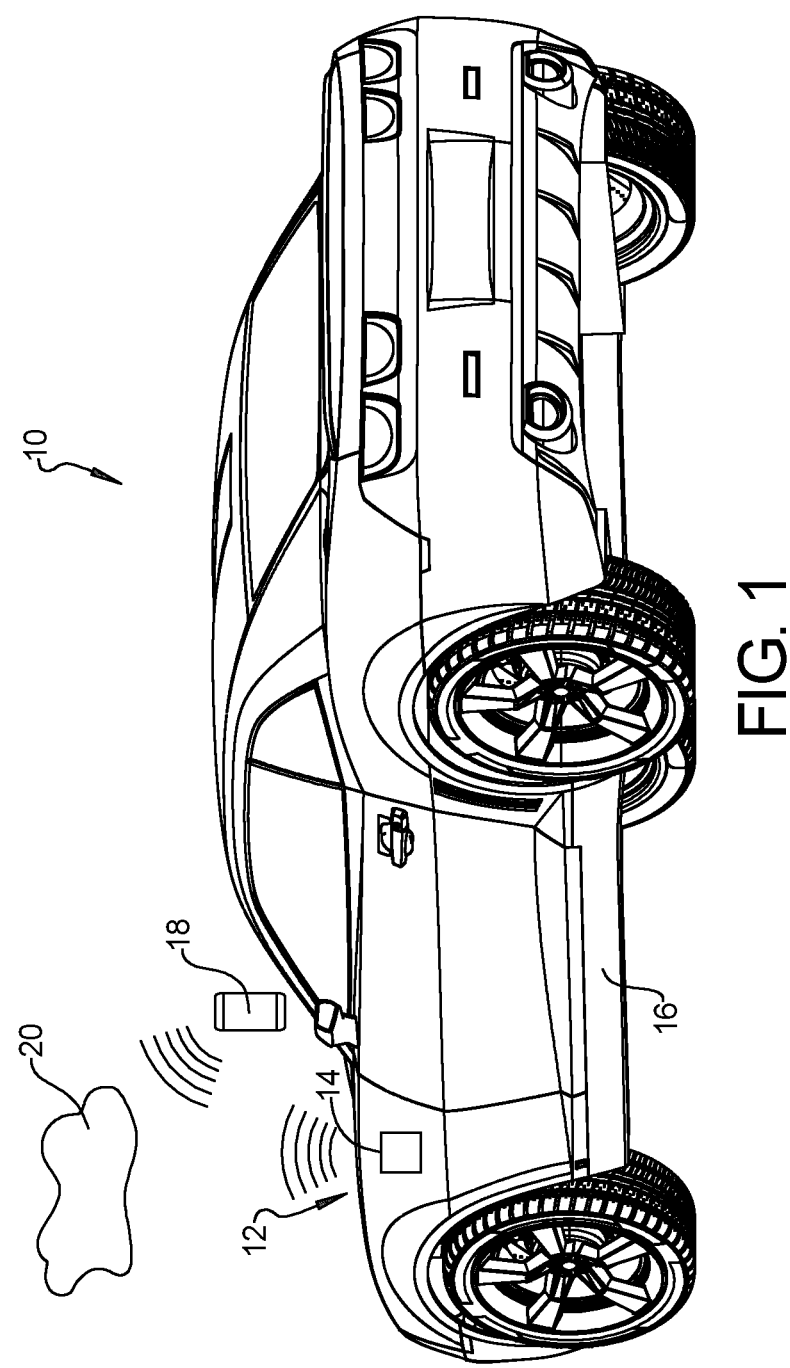
FIG. 1 is a rear left perspective view looking forward of an automobile vehicle having a system to detect an operator of the automobile vehicle according to an exemplary aspect.

Referring to FIG. 1, a system to detect a previous operator of an automobile vehicle in an emergency situation 10 is provided for an automobile vehicle 12. A communication and control device 14 of the automobile vehicle 12 identifies operating data from the automobile vehicle 12, including if an emergency situation is occurring. The emergency situation may include for example a thermal runaway event occurring in a battery pack 16 where the automobile vehicle 12 is electrically powered as either a primary propulsion source or a hybrid secondary propulsion source. The emergency situation may also include but is not limited to a vehicle accident, a vehicle fire, an occupant left-behind event, and the like. The emergency situation may be detected for example using a detection device which may be one or more sensors, cameras or similar devices installed in multiple locations of the automobile vehicle 12 including for example sensors installed in the battery pack 16.

The communication and control device 14 may communicate with at least one of multiple portable communication devices 18 which may be associated with a current occupant or a previous occupant of the automobile vehicle 12. The portable communication devices 18 may be for example one of multiple telephones or ultra-high-frequency (UHF) smart phones having a short-range wireless technology standard including for example Bluetooth® that is used for exchanging data between fixed and mobile devices over short distances using UHF radio waves in an ISM band, defining portions of the radio spectrum reserved internationally for industrial, scientific and medical purposes, and typically ranging from 2.402 gigahertz (GHz) to 2.48 GHz.

The operating data from the automobile vehicle 12 may be directly wirelessly communicated to a remote network 20 remote from the automobile vehicle 12 which may define a telematics office, a "back office", a cloud network, or the like. According to several aspects the portable communication devices 18 may also wirelessly communicate the operating data with the remote network 20.

Referring to FIG. 2 and again to FIG. 1, according to several aspects the automobile vehicle 12 may be an electrically operated vehicle which is located in a designated parking position 22. The parking position 22 provides access to a charging station 26 for charging the battery pack 16. During a charging operation an occupant/operator of the automobile vehicle 12 may not be present. An owner of the automobile vehicle 12 is commonly the most recent operator, however, the most recent operator may be determined as an occupant who most recently communicated using the portable communication device 18 connected through the communication and control device 14. It is therefore advantageous in an emergency situation such as a thermal runaway event occurring in the battery pack 16 to identify and then notify the most recent operator of the automobile vehicle 12 and an emergency service.

Figure 2:
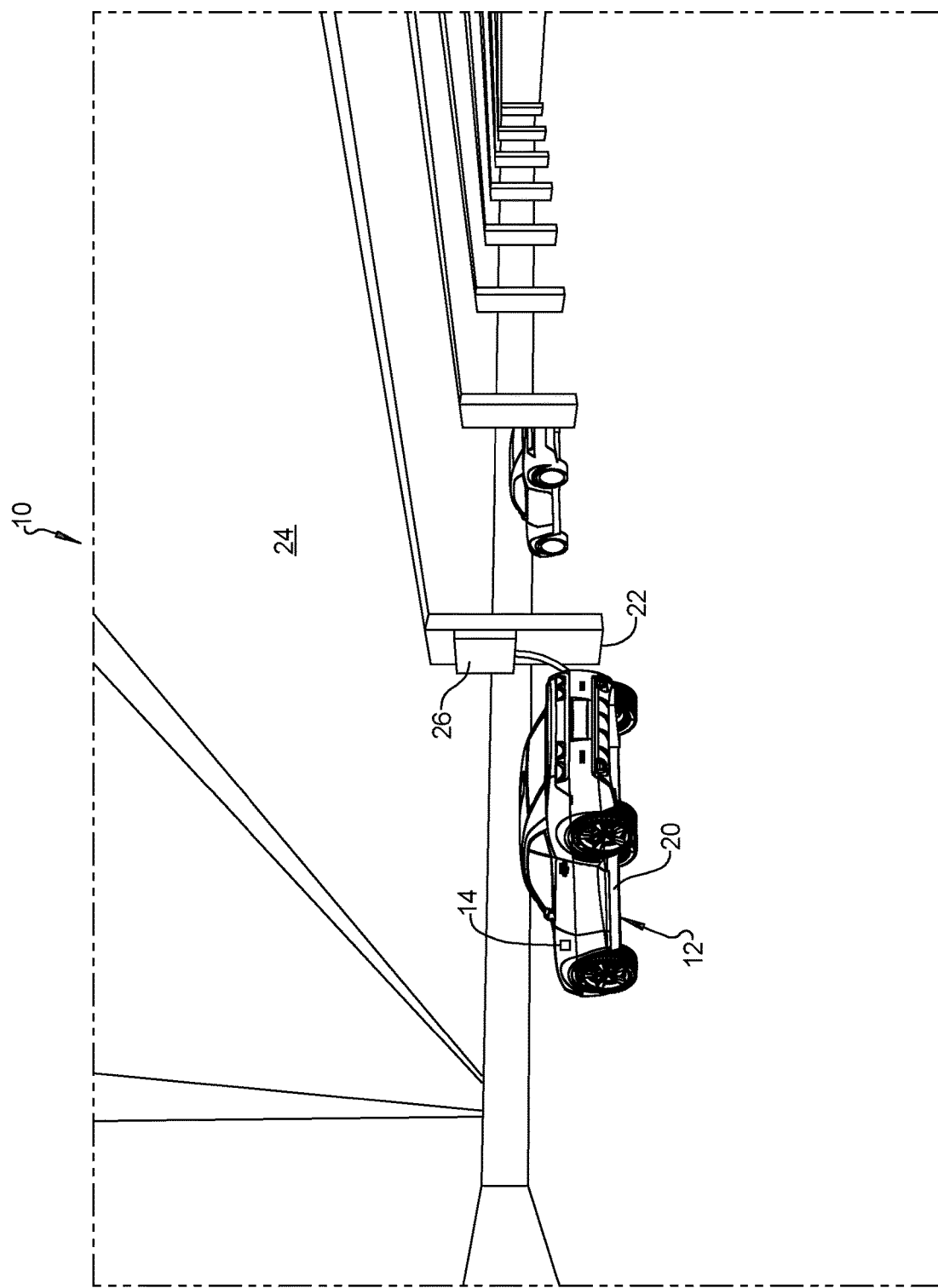
FIG. 2 is a rear left perspective view looking forward of the automobile vehicle of FIG. 1 parked in a parking structure.

Referring to FIG. 3 and again to FIGS. 1 and 2, a method for detecting a previous operator of an automobile vehicle in an emergency situation 28 is initiated by detecting an emergency event 30. Following detection of the emergency event, the system to detect a previous operator of an automobile vehicle in an emergency situation 10 in a detection and collection step 32 detects and collects stored information from either a currently connected one of the portable communication devices 18 or if no communication device is presently connected from another one of the portable communication devices 18 defining for example a previously connected portable communication device 34. In a following upload step 36 the data detected and collected in the detection and collection step 32 is uploaded to the remote network 20. In a following determination step 38 the data detected and collected in the detection and collection step 32 is applied to determine if there are one or more occupants currently in the automobile vehicle 12 using an existing one of the connected communication devices 18. If there is no current occupant detected, a last known vehicle occupant 42 is identified using one of the communication devices 18 which was most recently connected. In a first contact step 44 a previous occupant is contacted using a dialable phone number retrieved from a memory of one of the communication devices 18. If a previous occupant cannot be contacted, in a second contact step 46 a close emergency contact is contacted using emergency contact information saved in the one of the communication devices 18. In a final step 48 an emergency service is contacted to provide the above occupant data as well as an emergency status of the automobile vehicle 12.

Figure 3:
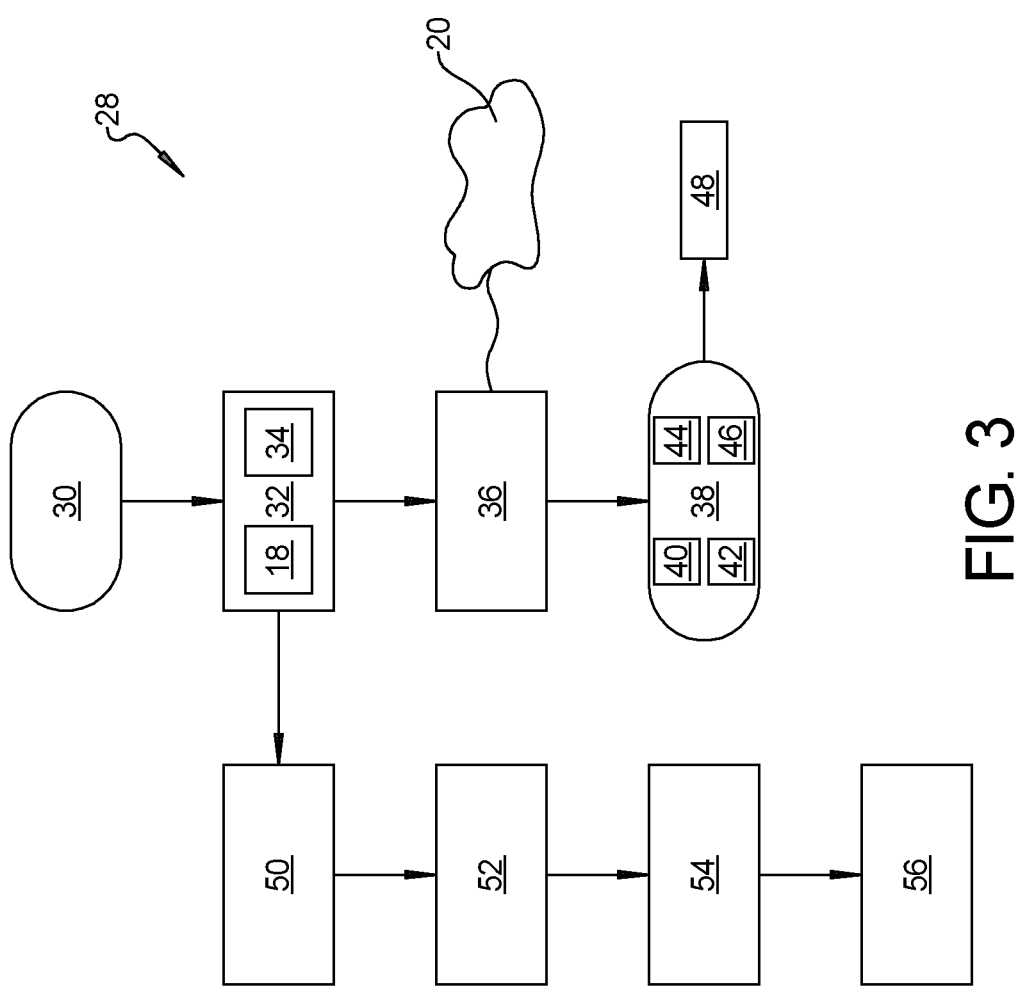
FIG. 3 is a flow diagram of method steps for performing operations of the system of the present disclosure.

With continuing reference to FIG. 3, associated with the detection and collection step 32 the method for detecting a previous operator of an automobile vehicle in an emergency situation 28 also performs the following store and upload steps. In a first store and upload step 50 a current dialable phone number of one of the communication devices 18 determined to be the presently or previously connected phone is uploaded and stored in the remote network 20. In a second store and upload step 52 a device identification number of the presently or previously connected communication device 18 is retrieved from the communication device 18 and uploaded and stored in the remote network 20. In a third store and upload step 54 emergency contact data saved in the presently or previously connected communication device 18 is uploaded and stored in the remote network 20. In a fourth store and upload step 56 a connection status of the presently or previously connected communication device 18 is uploaded and stored in the remote network 20.

The present system and method identify the most recent person in possession of the automobile vehicle 12 even when not currently occupying the automobile vehicle 12 using the most recent short-range wireless technology standard including for example Bluetooth® connected device. The most recent person in possession of the automobile vehicle 12 may be determined using an ordered list which may include features such as a timestamp and the connection status may be differentiated from an ordered list such as a paired device, a connected device, a device which is present but not paired, a device which is present but not connected, and the like. The timestamp may be developed by keeping an inventory of every device paired, connected, present and the like, with a chronological order to determine which should be contacted first.

The present system and method utilizes short-range wireless technology standard telephone information to: store and upload a current dialable phone number of the connected communication device 18; store and upload the device identification number of the connected communication device 18; store & upload emergency contacts stored in the communication device 18; and store and upload a connection status of the communication device 18. The present method utilizes the above stored and uploaded information to: determine if there are occupants currently in the automobile vehicle 12 with an existing connected communication device 18; determine the last known vehicle occupant by using the most recently connected communication device 18; contact the previous occupant with a dialable phone number; contact a close emergency contact identified in a database of the communication device 18 if the previous vehicle occupant cannot be reached; and relay pertinent information to a public safety entity.

The present system and method may utilize: a wireless technology standard such as Bluetooth® or Bluetooth® Handsfree Profile; an Electric Vehicle Thermal Runaway Emergency Call; and Telematics Emergency Services.

The present system and method provide a method to determine the most recent vehicle occupant or occupants of the automobile vehicle 12 during an emergency event using a currently connected or a previously connected communication device 18 such as a smart phone. An example scenario may be a thermal runaway event when there are no current vehicle occupants which may occur while the vehicle battery pack 16 is charging. Emergency services needs to know who best to contact. Contact information which is on file in the remote network 20 may not match the most recent operator of the automobile vehicle 12 or the person that needs to be alerted by emergency services. By using the most recently connected wireless technology standard such as Bluetooth® device information, the following elements to assess the emergency situation may be identified: 1) Detect any attached wireless technology standard such as Bluetooth® phone(s) to determine occupancy of the automobile vehicle; 2) Detect previous attached communication device(s) 18 to acquire contact numbers for the most recent operator when no operator is in the automobile vehicle 12; 3) Upload contacts for a no-answer situation, for example using ICE. Another method to determine the most recent operator may be to use an associated telematics emergency.

A system and method to detect a previous operator of an automobile vehicle in an emergency situation of the present disclosure offers several advantages. These include the capability to identify emergency contact information from a last connected or a recently connected communication device such as a smartphone, contact the last known operator of the automobile vehicle, or contact an emergency service if a recent operator is not found or contacted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method to detect and communicate using a vehicle, athe method comprising:
    identifying, by a detection device in the vehicle, an emergency situation occurring in the vehicle;
    determining, by a control and communication device in the vehicle, whether a recently connected communication device is presently connected to the vehicle;
    retrieving and contacting a current dialable number of the recently connected communication device when the recently connected communication device is presently connected to the vehicle; and
    retrieving and contacting a previously stored dialable number of a previously connected communication device when the recently connected communication device is not presently connected to the vehicle.

2. The method of claim 1, further including retrieving and contacting emergency contact data saved in the recently connected communication device or the previously connected communication device if neither the recently connected communication device or the previously connected communication device is successfully contacted.

3. The method of claim 2, further including storing the emergency contact data in a network remote from the vehicle.

4. The method of claim 3, further including loading a device identification number of the recently connected or previously connected communication device retrieved from the communication device into the network remote from the vehicle.

5. The method of claim 4, further including when the recently connected communication device is presently connected to the vehicle sending a signal to the recently connected communication device identifying a presence of the emergency situation.

6. The method of claim 1, wherein the previously connected communication device is a next most recently connected communication device.

7. The method of claim 6, further including sending a signal to the next most recently connected communication device identifying a presence of the emergency situation.

8. The method of claim 7, further including notifying an emergency service when the next most recently connected communication device is not available.

9. The method of claim 1, further including differentiating if the emergency situation is a thermal runaway event occurring in a battery pack of the vehicle or an occupant left-behind event.

10. The method of claim 1, further including sending a connection status of the recently connected communication device to a network remote from the automobile vehicle, wherein the connection status includes one of connected to the vehicle or not connected to the vehicle.

11. A method to detect and communicate using a vehicle, the method comprising:
    retrieving, by a control and communication device in the vehicle, a current dialable number of a recently connected communication device presently connected to the vehicle;

uploading and storing the current dialable number of the recently connected communication device to a network that is remote from the vehicle;

identifying, by a detection device in the vehicle, an emergency situation occurring in the vehicle;

determining, by the control and communication device of the vehicle, whether the recently connected communication device is still presently connected to the vehicle;

retrieving and contacting the current dialable number of the recently connected communication device when the recently connected device is still presently connected to the vehicle;

retrieving and contacting a previously stored dialable number of a previously connected communication device from the network remote from the vehicle when the recently connected communication device is not presently connected to the vehicle; and retrieving and contacting emergency contact data saved in the recently connected portable device if neither the recently connected portable device or the previously connected portable device is successfully contacted.

12. The method of claim 11, further comprising storing the emergency contact data in the network remote from the vehicle when the current dialable number is uploaded and stored in the network.

13. The method of claim 11, further comprising when the recently connected communication device is presently connected to the vehicle, sending a signal to the recently connected communication device identifying a presence of the emergency situation.

14. The method of claim 11, wherein the previously connected communication device is a next most recently connected communication device relative to the recently connected communication device.

15. The method of claim 14, further including sending a signal to the next most recently connected communication device identifying a presence of the emergency situation.

16. The method of claim 15, further including notifying, by the control and communication device of the vehicle, an emergency service of the emergency situation when the next most recently connected communication device is not available.

17. The method of claim 11, further including sending a connection status of the recently connected communication device to the network remote from the vehicle, wherein the connection status includes one of connected to the vehicle or not connected to the vehicle.

* * * * *